May 20, 1930. H. E. HELM 1,758,948
ANCHOR ROD CLAMP
Filed April 10, 1929
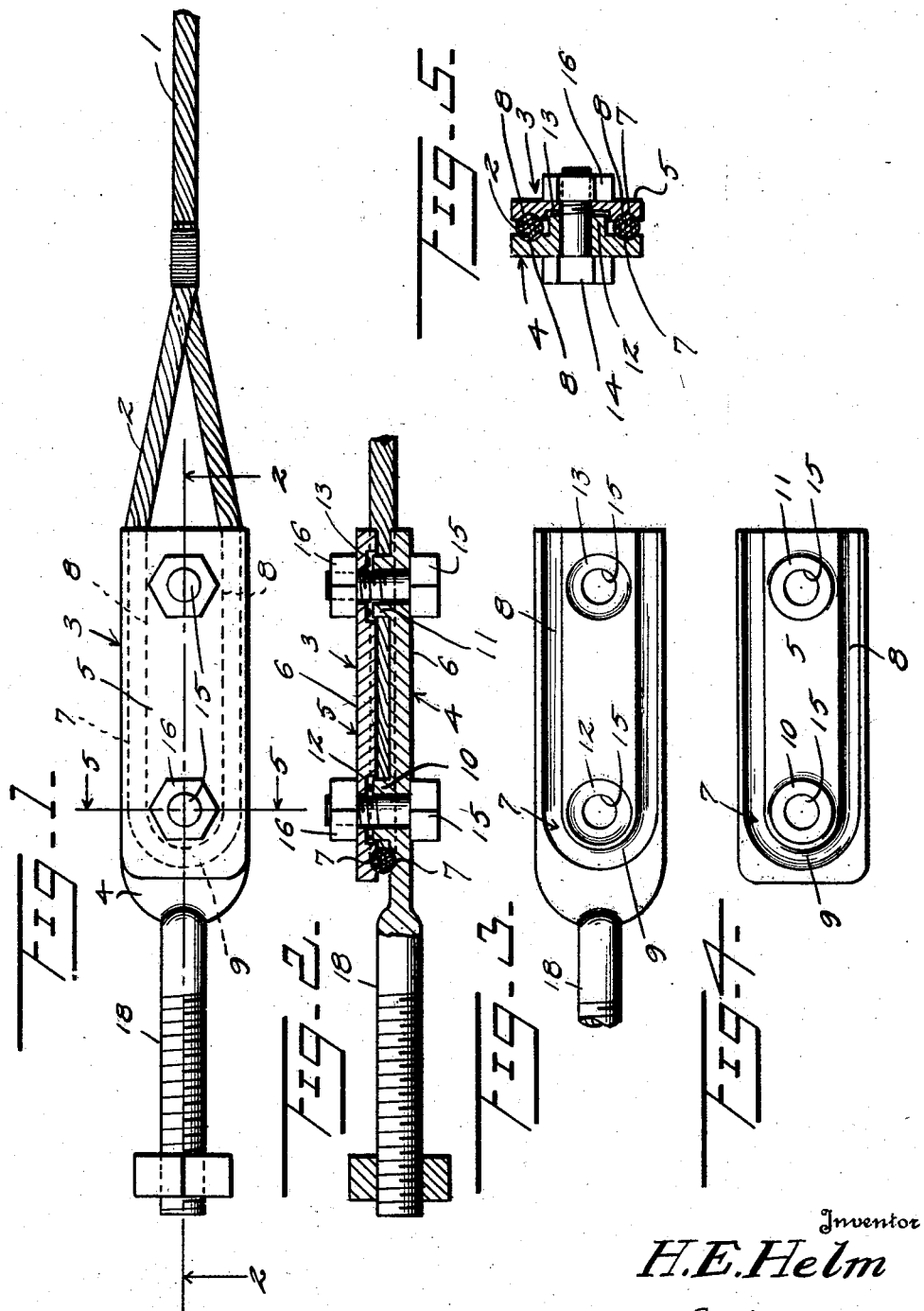
Inventor
H. E. Helm Patented May 20, 1930

1,758,948

UNITED STATES PATENT OFFICE

HARRY E. HELM, OF HUNTINGTON, INDIANA

ANCHOR-ROD CLAMP

Application filed April 10, 1929. Serial No. 354,053.

This invention relates to new and useful improvements in anchor rod clamps.

The primary object of my invention is to provide an anchor rod clamp that is simple and economical in construction, easy and convenient to operate and highly efficient and durable in use.

With the foregoing and other objects in view that will appear as the nature of my invention is better understood, the same consists in the novel features of construction, combination and arrangement of parts illustrated in the accompanying drawings and more particularly pointed out in the appended claim.

In the accompanying drawings, which are for illustrative purposes only and are therefore not drawn to scale:

Figure 1 is a perspective view, illustrating the application of my invention.

Figure 2 is a similar view, showing how the guy wire or cable may be inserted when the fastening bolts of the two clamp sections are slightly loosened.

Figure 3 is a central longitudinal section.

Figure 4 is a transverse section, taken on line 4—4 of Figure 3.

Figure 5 is an inner face view of the male clamp section.

Referring to the drawings for a more particular description of my invention and in which drawings like parts are designated by like reference characters throughout the several views, 1 designates the guy wire or cable, provided at one end with the loop 2 and 3 my improved anchor rod clamp, as a whole.

The anchor rod clamp comprises two metal clamping sections 4 and 5, each consisting of a flat elongated bar 6 formed in its inner face with a loop-shaped groove 7 extending the full length of the bar and having parallel sides 8 and semi-circular inner portion 9 merging with said sides. The clamping section 4 is also formed on its inner face with the tubular longitudinally spaced outwardly projecting offsets or bosses 10 and 11, which are situated adjacent the outer and inner ends, respectively, of the clamping section, within the space prescribed by the loop-shaped groove 7. The inner face of the clamping bar 5 is provided adjacent its inner and outer ends and within the space prescribed by the groove 7 thereof, with the recesses 12 and 13, adapted to receive the tubular offsets or bosses 10 and 11 when the clamping bars 4 and 5 are in normal position. It will be understood that when the aforesaid bars are placed together, the loop 2 of the guy wire or cable 1, is received by the registering loop-shaped grooves of the bars.

The clamping bars are secured together by the fastening bolts 14 which are inserted through the tubular offsets or bosses 10 and 11 and corresponding openings 15 in the recesses 12 and 13, for screw threaded engagement with the nuts 16. The tubular boss 11 of the clamping section 4 is formed with a groove 17 to receive the loop 2 of the guy wire or cable 1 and acts as a slide around which the cable may be pulled to secure the desired tension. The tubular boss 10 is not grooved, but acts as a guide for the guy wire or cable in securing the required tension.

In practice, by slightly loosening the fastening bolts 14, the guy wire or cable may be inserted in the loop-shaped grooves 7 of the clamping sections 4 and 5. The bolts may then be tightened by screwing up the nuts 16, after securing the desired tension of the cable and the latter left indefinitely. This operation is very simple and saves considerable time and labor, as the device is so constructed as to practically consist of one piece, as compared with analogous devices now in use comprising several parts and requiring several operations and the services of several persons to make the connection between the guy wire or cable and the anchor rod.

Attention is invited to the fact that my clamp possesses great pulling strength and that pressure is exerted against the entire surface of the loop of the guy wire embraced by the clamp. The clamping sections may be made of any desired length or other dimensions and by the use of additional fastening bolts as much friction surface may be provided as required in any use to which the device may be applied.

The clamping bar 4 is provided at its inner end with an anchor rod 18 which may be of any desired size or length to meet different requirements.

From the foregoing description taken in connection with the drawings, it is thought that the construction, operation and advantages of my invention will be readily understood without requiring a more extended explanation.

Various changes in the form, proportions and minor details of construction may be resorted to without departing from the principles or sacrificing any of the advantages of my invention as defined in the appended claim.

Having described my invention, what I claim as new and desire to secure by Letters Patent, is:

An anchor rod clamp comprising male and female sections having registering loop-shaped grooves to receive the loop of a guy wire or cable and interlocking bosses and recesses, transverse fastening bolts extending through said recesses and bosses and nuts screwing on the threaded ends of said bolts.

In testimony whereof he affixes his signature.

HARRY E. HELM.